US012352907B2

(12) United States Patent
Benson et al.

(10) Patent No.: US 12,352,907 B2
(45) Date of Patent: Jul. 8, 2025

(54) METHODS AND APPARATUS FOR RADIOGRAPHIC SOURCE EXPOSURE

(71) Applicant: QSA Global Inc., Burlington, MA (US)

(72) Inventors: Paul Benson, Waltham, MA (US); Joseph Ryan Lapinskas, Windham, NH (US)

(73) Assignee: QSA Global Inc., Burlington, MA (US)

( * ) Notice: Subject to any disclaimer, the term of this patent is extended or adjusted under 35 U.S.C. 154(b) by 144 days.

(21) Appl. No.: 18/295,630

(22) Filed: Apr. 4, 2023

(65) Prior Publication Data

US 2023/0314630 A1 Oct. 5, 2023

Related U.S. Application Data

(60) Provisional application No. 63/327,545, filed on Apr. 5, 2022.

(51) Int. Cl.
*G01T 1/20* (2006.01)
*G01T 1/02* (2006.01)
(Continued)

(52) U.S. Cl.
CPC .............. *G01T 1/02* (2013.01); *G01T 7/00* (2013.01); *G21F 5/06* (2013.01)

(58) Field of Classification Search
CPC ..... G01T 1/02; G01T 7/00; G21F 5/06; G21F 5/015
See application file for complete search history.

(56) References Cited

U.S. PATENT DOCUMENTS

| 4,314,157 A * | 2/1982 | Gaines ...................... G21F 5/02 250/497.1 |
| 10,276,272 B2 | 4/2019 | Benson et al. |
| 2022/0132646 A1 * | 4/2022 | Grenier .................. H05G 1/085 |

FOREIGN PATENT DOCUMENTS

| KR | 20220006422 | 1/2022 |
| WO | 2015003248 | 1/2015 |

OTHER PUBLICATIONS

QSA Global 880 Series Gamma-Ray Source Projector & Transport Container Operations & Maintenance Manual. MAN-027, Sep. 2022, pp. 1-88.

(Continued)

*Primary Examiner* — Kiho Kim
(74) *Attorney, Agent, or Firm* — McAndrews, Held & Malloy, Ltd.

(57) ABSTRACT

An example radiographic source exposure device includes: a housing; a radiographic source capsule within the housing, the radiographic source capsule having a radionuclide; a shield within the housing and configured to shield the radiographic source capsule and to permit extension of the radiographic source capsule to expose the radiographic source capsule; one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear; a processing system within the housing and configured to store the sensor data and output the sensor data; and a power source within the housing and configured to provide power to the processing system.

15 Claims, 11 Drawing Sheets

(51) Int. Cl.
  *G01T 7/00* (2006.01)
  *G21F 5/06* (2006.01)

(56) References Cited

OTHER PUBLICATIONS

Int'l Search Report and Written Opinion Appln No. PCT/US2023/065362 mailed Jun. 28, 2023.

* cited by examiner

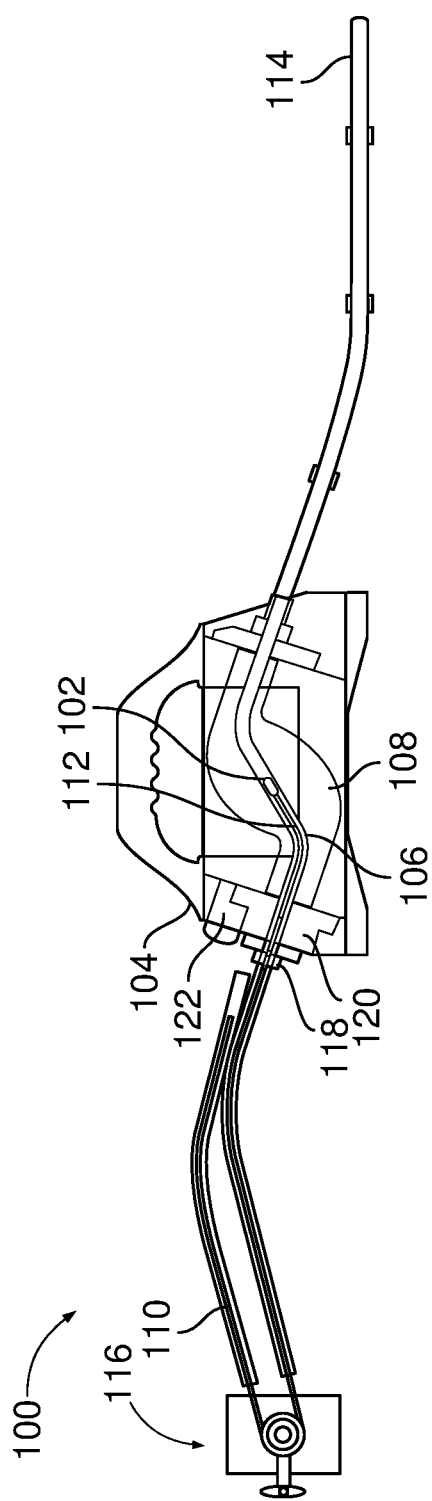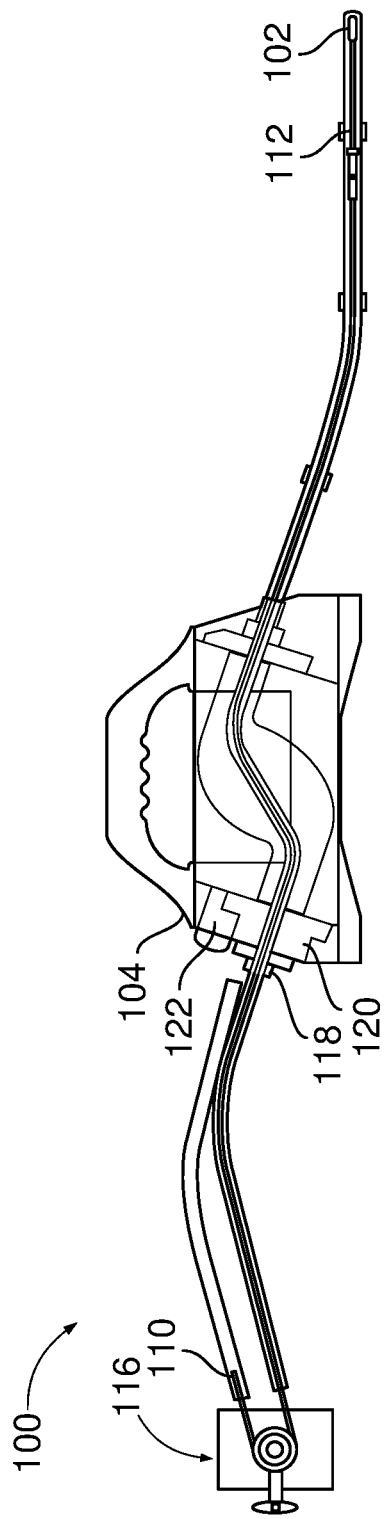

METHODS AND APPARATUS FOR
RADIOGRAPHIC SOURCE EXPOSURE

FIELD OF THE DISCLOSURE

This disclosure relates generally to radiography and, more particularly, to methods and apparatus for radiographic source exposure.

BACKGROUND

Industrial radiography is often used for producing images of objects that are otherwise difficult to inspect, and involves exposing a source of high-energy radiation (e.g., gamma rays) and collecting penetrating and/or reflected rays to form a radiographic image. When not in use, gamma ray sources, such as radioactive isotopes, are stored in shielding devices.

SUMMARY

Methods and apparatus for radiographic source exposure are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1A and 1B illustrate example radiographic system for providing radiation for radiography, in accordance with aspects of this disclosure.

The FIGURES are not necessarily to scale. Wherever appropriate, similar or identical reference numerals are used to refer to similar or identical components.

DETAILED DESCRIPTION

Figure 2:
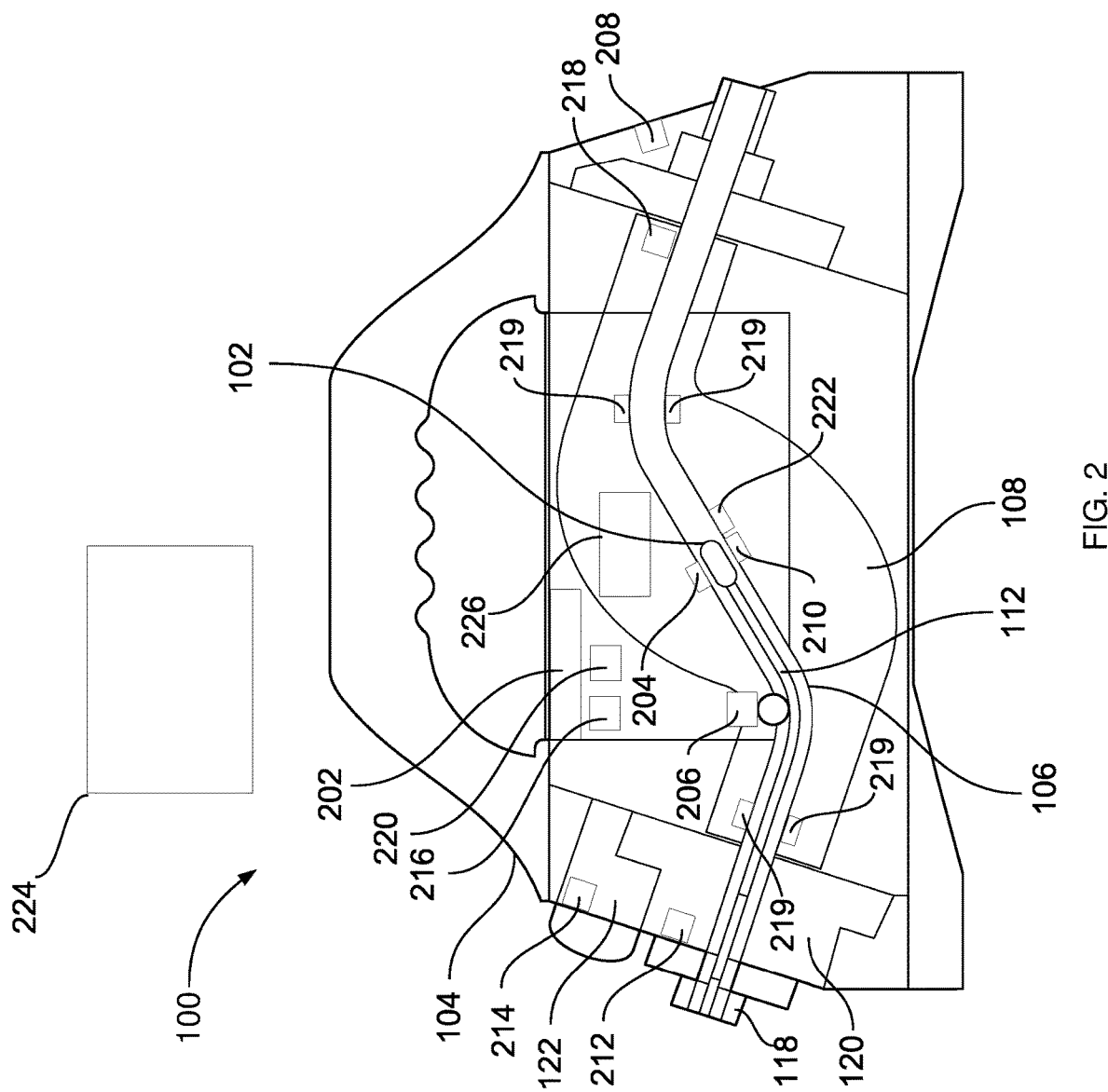
FIG. 2 illustrates an example radiographic system including a processing system and a plurality of sensors to monitor the radiographic system.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the term "radiographic source" refers to a quantity of a radionuclide which provides one or more ionizing electromagnetic radiation emissions (e.g., X-rays, gamma rays, etc.) useful in radiographic applications.

Disclosed example radiographic source exposure devices include: a housing; a radiographic source capsule within the housing, the radiographic source capsule having a radionuclide; a shield within the housing and configured to shield the radiographic source capsule and to permit extension of the radiographic source capsule to expose the radiographic source capsule; one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear; a processing system within the housing and configured to store the sensor data and output the sensor data; and a power source within the housing and configured to provide power to the processing system.

In some example radiographic source exposure devices, the power source is a battery. In some example radiographic source exposure devices, the power source includes a photovoltaic cell configured to convert radiation from the radiographic source to electrical energy when the radiographic source is in a stored position and store the electrical energy in the battery. In some example radiographic source exposure devices, the processing system includes communication circuitry configured to transmit the sensor data to an external computing system.

In some example radiographic source exposure devices, the one or more sensors include a proximity sensor configured to detect when the radiographic source is in a predetermined position to count the exposure cycles. In some example radiographic source exposure devices, the one or more sensors include an odometer configured to measure a length between the radiographic source capsule position and the stored position.

In some example radiographic source exposure devices, the one or more sensors include a dosimeter configured to detect whether the radiographic source capsule is in a stored position. Some radiographic source exposure devices further include a display device, in which the processing system is configured to display information on the display device based on the sensor data.

In some example radiographic source exposure devices, the one or more sensors include a proximity sensor configured to detect the locking device locking mode status by detecting a position of the locking device. In some example radiographic source exposure devices, the one or more sensors include a proximity sensor configured to detect the unlocking key status. In some example radiographic source exposure devices, the one or more sensors include an accelerometer to detect at least one of the radiographic source exposure device orientation or the shock event.

In some example radiographic source exposure devices, the one or more sensors include a particle counter configured to measure the particulate count within the shield. In some such examples, the particle counter is configured to count foreign material particulate. In some examples, the processing system is configured to determine a change to an inspection or maintenance schedule based on the particulate count.

In some example radiographic source exposure devices, the one or more sensors include a wear sensor configured to detect a worn-through condition in a source tube, the radiographic source capsule being housed within the source tube.

FIGS. 1A and 1B illustrate example radiographic system 100 for providing radiation for radiography. The radiographic system 100 of FIG. 1 includes a radiographic source 102 which is contained within a radiographic source housing 104. The example radiographic source 102 is a mass of radioactive material which emits radiation (e.g., X-rays and/or gamma rays) due to decay of the material.

The radiographic source housing 104 includes an S-shaped source tube 106 within a shield 108. The source tube 106 provides a pathway for the radiographic source 102 to be exposed to an exterior of the shield 108 and retracted to a shielded position within the interior of the shield 108. FIG. 1A illustrates the radiographic source 102 in the shielded position, and FIG. 1B illustrates the radiographic source in an exposed position.

To control the position of the radiographic source 102, the radiographic source housing 104 enables connection of a control cable 110 to the radiographic source 102 for exposure and retraction of the radiographic source 102. The control cable 110 may be physically attached or connected to a source connector 112 that is physically coupled to the radiographic source 102.

When engaged, the control cable 110 is controlled to extend into and through the source tube 106 to push the radiographic source 102 to an exposed position external to the radiographic source housing 104. Conversely, the control cable 110 is retracted to pull the radiographic source 102 from the exposed position back into the source tube 106 to the shielded position, at which time the control cable 110 may be detached from the radiographic source 102.

In the system 100 of FIG. 1, the exposed position of the radiographic source 102 may be controlled by a guide tube 114, through which the radiographic source 102 travels as the source 102 is pushed by the control cable 110. The control cable 110 has sufficient column strength to push the radiographic source 102 through the source tube 106 and through the guide tube 114.

The control cable 110 is controlled by a remote control 116. The remote control 116 is connected to a remote control interface 118 to physically engage the control cable 110 to advance or retract the control cable 110 relative to the remote control 116. The radiographic source 102 may be locked against movement by a locking device 120. The locking device 120 is used to secure the radiographic source 102 against unintentional exposure when in the stored position (illustrated in FIG. 1A). The locking device 120 may be moved to an unlocked position by an unlocking device 122 (e.g., a button, lever, switch, key, etc.), which may be actuated by the operator to place the system 100 in an unlocked state and mechanically permit exposure of the radiographic source 102 via the remote control 116.

FIG. 2 illustrates an example radiographic source exposure device 200 including a processing system 202 and a plurality of sensors to monitor the radiographic source exposure device 200. The radiographic source exposure device 200 of FIG. 2 includes the radiographic source 102, the radiographic source housing 104, source tube 106, the shield 108, the source connector 112, the remote control interface 118, the locking device 120, and the unlocking device 122 of FIGS. 1A and 1B.

The example radiographic source exposure device 200 further includes sensors connected to the processing system 202, which collects, processes, stores, and/or outputs sensor data collected from the sensors. Example sensors that may be included on the radiographic source exposure device 200 include: a proximity sensor 204 configured to detect when the radiographic source 102 is in a predetermined position (e.g., the stored position) to enable counting of exposure cycles (e.g., cycles of source exposure and retraction); an odometer 206 that measures a length between the actual position of the radiographic source 102 and a reference position (e.g., the stored position); an external dosimeter 208 to measure or detect a surface dose; an internal dosimeter 210 to measure or detect decay of the radiographic source 102 (e.g., a reduction in radioactivity); a locking device proximity sensor 212 to detect the locking mode status (e.g., locked position, unlocked position) of the locking device 120 by detecting a position of one or more mechanical components of the locking device 120; an unlocking device proximity sensor 214 to detect a status of an unlocking key (e.g., if an unlocking key is present) in the unlocking device 122; an accelerometer 216 (or gyroscope or inertial measurement unit (IMU)) to detect motion of the radiographic source exposure device 200, to detect shock events (e.g., rapid changes in acceleration, such as collisions or dropping the radiographic source exposure device 200), to detect the orientation of the radiographic source exposure device 200, and/or any other motion-related information; a particle counter 218 to count particulate present in the shield 108 or source tube 106; and/or a wear sensor 219 to detect a worn-through condition in the source tube 106.

Any one or more of the example sensors 204-218 may be present on the radiographic source exposure device 200 and in communication with a digital or analog data collection interface of the processing system 202. The processing system 202 receives or collects the sensor data, and stores the raw and/or processed sensor data in a storage device for subsequent retrieval, processing, reporting, and/or transmission. For example, the processing system 202 may process some or all of the sensor data to monitor for situations in which the operator or manager is to be notified or which are to be logged in the storage device, examples of which are described in more detail below with reference to FIGS. 4-10.

To power the processing system 202, the radiographic source exposure device 200 may include an energy storage device 220 such as a battery. The energy storage device 220 can be charged by any charging system, such as a USB charger, a solar charger, a mains-based charger, and/or any other charging methods. Additionally or alternatively, the radiographic source exposure device 200 may include a photovoltaic system 222 configured to convert the electromagnetic radiation emitted by the radiographic source 102 (e.g., while in the stored position) to electricity, which can then be converted as needed and stored in the energy storage device 220. The photovoltaic system 222 may be tuned for the type of radionuclide used in the radiographic source 102, and thereby makes use of energy that would otherwise be absorbed and dispersed in the shield 108. An example implementation of the photovoltaic system 222 is described by John K. LIAKOS (2011) Gamma-Ray-Driven Photovoltaic Cells via a Scintillator Interface, Journal of Nuclear Science and Technology, 48:12, 1428-1436, DOI: 10.1080/18811248.2011.9711836 ("Liakos"). The entirety of Liakos is incorporated herein by reference.

The example processing system 202 may communicate with one or more external computing system 224 to transmit sensor data, processed and/or logged information, usage information, and/or any other data. The external computing system 224 may be a server, a mobile device (e.g., a smartphone), a tablet computer, a personal digital assistant, a laptop or other computer, and/or any other type of computing system. The processing system 202 may communicate with the external computing system 224 via wired and/or wireless connections, directly and/or via one or more intermediary devices (e.g., wired and/or wireless communication networks, access points, hotspots, tethering devices, etc.).

The example housing 104 may include a user interface 226 that provides for user inputs to the processing system 202 and/or outputs from the processing system 202 to the operator. Example outputs may include alerts or notifications, menus, measured data, device configuration and/or other device characteristics, and/or any other information. Example inputs may include menu selection, data retrieval, data resets, radiographic source information (e.g., activity, serial number, focal dimension, etc.), maintenance history, and/or any other inputs to the processing system 202. The user interface 226 may buttons, a touchscreen, and/or other devices for data input, and/or may be configured to communicate with an external device (e.g., an operator's smartphone, the external computing device 224, etc.) for data input and/or data output, and/or may enable inputting and/or outputting data via computer readable indicia (e.g., QR code, barcode, etc.), via radio frequency identification (d), near field communication (NFC), and/or any other close proximity communications connection.

The proximity sensor 204 detects whether the radiographic source 102 (or other component of the radiographic source exposure device 200) is in a predetermined position, such as the stored position. By detecting when the radiographic source 102 is moved away from the predetermined position and returned to the predetermined position, the number of exposure cycles performed by the radiographic source exposure device 200 may be tracked by the processing system 202.

The odometer 206 measures a distance traveled by the source cable and/or control cable, and thereby tracks a distance traveled by the radiographic source 102. For example, as the radiographic source 102 is extended, the odometer 206 measures the length of extension, and the processing system 202 may determine a maximum extension for each exposure. As the radiographic source 102 is retracted, the odometer 206 measures the length of retraction, which may also be used to measure whether the radiographic source 102 is in the stored position (e.g., if the net travel measured by the odometer is zero).

The external dosimeter 208 is configured to measure radiation in a direction of the exposure of the radiographic source 102 (e.g., toward the guide tube 114) to measure or detect whether the radiographic source 102 is exposed or otherwise out of the stored position. Conversely, the internal dosimeter 210 is positioned adjacent the radiographic source 102 in the stored position to measure or detect the output of the radiographic source 102. The processing system 202 may monitor output of the radiographic source 102 over time to determine whether the radiographic source 102 is in the stored position (e.g., when the measured dose is more than an exposure threshold). In some examples, the processing system 202 may determine when the radiation output is less than a depletion threshold (e.g., an absolute radiation output, a percentage of the output measured when the radiographic source 102 is installed in the radiographic source exposure device 200, etc.). When the radiation output decreases below the threshold, the processing system 202 may output a notification that the radiographic source should be inspected and/or replaced.

Any of the example proximity sensor 204, the external dosimeter 208, and/or the internal dosimeter 210 may be coupled to or include a timer or clock to determine an exposure time of the radiographic source 102. For example, the proximity sensor 204, the external dosimeter 208, and/or the internal dosimeter 210 may trigger or start the timer upon detecting that the source 102 has moved from a storage position (e.g., non-exposed position), and read the value of the timer when the source 102 is detected back in the storage position (e.g., non-exposed position). Additionally or alternatively, the timer may provide the timer value to the operator and/or provide an indication to the operator when a threshold exposure duration has been reached. The duration and/or expiration of a threshold duration may inform the operator when the source 102 has been exposed for a specified time to satisfy a radiography specification. In some examples, the alerts and/or timer values may be communicated via wired or wireless communications to the external computing device 224.

Additionally or alternatively, the timer may include a clock that can provide a timestamp and duration to each exposure of the source 102 (e.g., for tracking and/or verification purposes). The timestamp, exposure duration, location, and/or any other data may be used to generate reports of radiographic activities.

The locking device proximity sensor 212 detects a locking mode status (e.g., locked position, unlocked position) of the locking device 120 by detecting, for example, whether a moving component of the locking device 120 is in a predetermined position associated with a locked state or a predetermined position associated with an unlocked state. Similarly, the unlocking device proximity sensor 214 detects a status of an unlocking key, such as by detecting whether an unlocking key is present or in a predetermined position corresponding to an unlocked state of the locking device 120.

The accelerometer 216 detects a gravitational vector and/or motion of the radiographic source exposure device 200. By analyzing the gravitational vector with respect to a known orientation of the accelerometer 216 with respect to the housing 104, the processing system 202 may detect the orientation of the housing 104. The accelerometer 216 may further identify physical shocks (e.g., rapid changes in acceleration, such as collisions or dropping the radiographic source exposure device 200) by detecting rapid increases and/or decreases in acceleration. The acceleration may be used in conjunction with other sensor data to determine, for example, that the radiographic source exposure device 200 is being moved while in an unlocked state or while the radiographic source is still projected or exposed.

The particle counter 218 counts particulate present in the shield 108 or source tube 106. The particulate counts may provide an indication of wear on the shield 108 or source tube 106 resulting in, for example, an acceleration (or deceleration) in the inspection or maintenance schedule of the radiographic source exposure device 200. Additionally or alternatively, the processing system 218 may determine the particulate count as an indication of foreign material (e.g., dirt, dust, etc.) from the operating environment. Paths for foreign material to enter the system could indicate a worn guide tube allowing ingress of foreign material, improper maintenance of drive cables, and/or other causes. The processing system 202 may use the foreign particulate count to accelerate and/or decelerate in inspection and/or maintenance schedules.

The wear sensor 219 is positioned at one or more locations adjacent the source tube 106, and detects a worn-through condition in the source tube 106 that may render the radiographic source exposure device 200 unfit for use. For example, the control cable 110 may wear through one or more locations in the source tube 106, which exposes the shield 108 (e.g., a depleted uranium shielding material). The wear sensor 219 may include eddy current sensors to induce and/or measure changes in eddy current in the source tube 106, ultrasonic sensors which measure the structural conditions of the source tube 106, a resistivity sensor to measure a resistance of the source tube 106, and/or any other sensors to determine a condition of the source tube 106 to detect worn-through conditions. In some examples, the processing system 202 may calculate a predicted remaining useful life of the source tube 106 based on the value(s) (e.g., historical trends) of the output values from the wear sensor(s) 219.

The example processing system 202 may include some or all of the components of the electronic tag (eTag) component of the Mobile Source Transit Security system developed by Pacific Northwest National Laboratory. The processing system 202 may include wireless communications systems for local area communications and/or wide area communications (e.g., telematics), power storage, location sensors (e.g., global positioning system (GPS) or other geolocation sensors), processing devices, storage or memory devices, and/or any other onboard systems.

Figure 3:
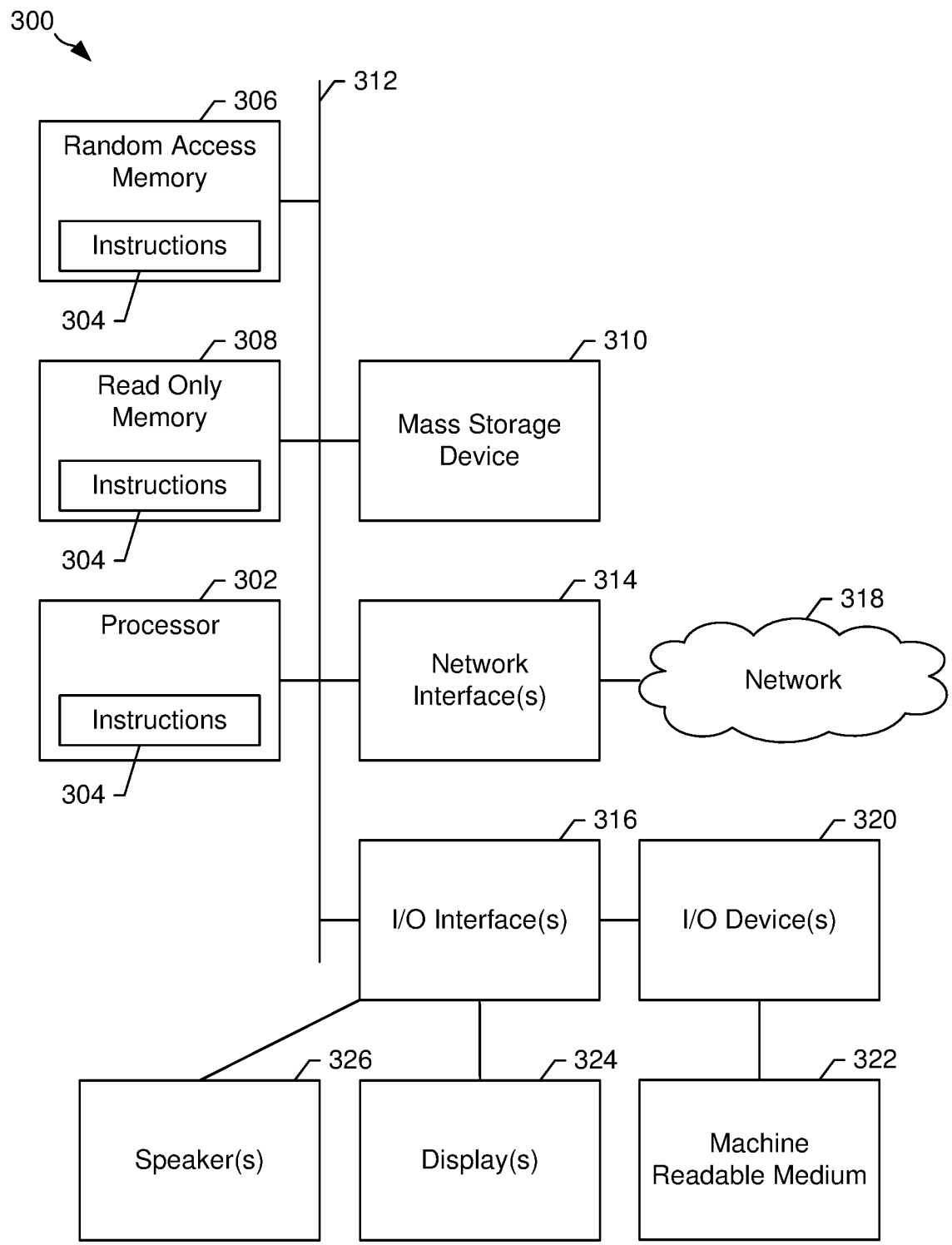
FIG. 3 is a block diagram of an example computing system which may implement the processing system and/or the computing system of FIG. 2.

FIG. 3 is a block diagram of an example computing system 300 that may be used to implement either of the processing system 202 and/or the external computing device 224 FIG. 2. The example computing system 300 may be implemented using a personal computer, a server, a smartphone, a laptop computer, a workstation, a tablet computer, and/or any other type of computing device.

The example computing system 300 of FIG. 3 includes a processor 302. The example processor 302 may be any general purpose central processing unit (CPU) from any manufacturer. In some other examples, the processor 302 may include one or more specialized processing units, such as RISC processors with an ARM core, graphic processing units, digital signal processors, and/or system-on-chips (SoC). The processor 302 executes machine readable instructions 304 that may be stored locally at the processor (e.g., in an included cache or SoC), in a random access memory 306 (or other volatile memory), in a read only memory 308 (or other non-volatile memory such as FLASH memory), and/or in a mass storage device 310. The example mass storage device 310 may be a hard drive, a solid state storage drive, a hybrid drive, a RAID array, and/or any other mass data storage device.

A bus 312 enables communications between the processor 302, the RAM 306, the ROM 308, the mass storage device 310, a network interface 314, and/or an input/output interface 316.

The example network interface 314 includes hardware, firmware, and/or software to connect the computing system 300 to a communications network 318 such as the Internet. For example, the network interface 314 may include IEEE 802.X-compliant wireless and/or wired communications hardware for transmitting and/or receiving communications.

The example I/O interface 316 of FIG. 3 includes hardware, firmware, and/or software to connect one or more input/output devices 320 to the processor 302 for providing input to the processor 302 and/or providing output from the processor 302. For example, the I/O interface 316 may include a graphics processing unit for interfacing with a display device 324, a universal serial bus port for interfacing with one or more USB-compliant devices, a FireWire, a field bus, and/or any other type of interface. Example I/O device(s) 320 may include the sensor(s) 204-218, a keyboard, a keypad, a mouse, a trackball, a pointing device, a microphone, an audio speaker 326, an optical media drive, a multi-touch touch screen, a gesture recognition interface, the display device 324, a magnetic media drive, and/or any other type of input and/or output device.

In some examples, the display device 324 may be implemented on the housing 104 (e.g., the user interface 226), on a remote control device (e.g., the remote control 116 of FIGS. 1A and 1B), and/or on the external computing device 224 (e.g., on the operator's smartphone). Communication with the display on the remote control 116 and/or the external computing device 224 may be accomplished by wired and/or wireless communication.

The example computing system 300 may access a non-transitory machine readable medium 322 via the I/O interface 316 and/or the I/O device(s) 320. Examples of the machine readable medium 322 of FIG. 3 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Example wireless interfaces, protocols, and/or standards that may be supported and/or used by the network interface(s) 314 and/or the I/O interface(s) 316 include wireless personal area network (WPAN) protocols, such as Bluetooth (IEEE 802.15); near field communication (NFC) standards; wireless local area network (WLAN) protocols, such as WiFi (IEEE 802.11); cellular standards, such as 2G/2G+ (e.g., GSM/GPRS/EDGE, and IS-95 or cdmaOne) and/or 2G/2G+ (e.g., CDMA2000, UMTS, and HSPA); 4G standards, such as WiMAX (IEEE 802.16) and LTE; Ultra-Wideband (UWB); etc. Example wired interfaces, protocols, and/or standards that may be supported and/or used by the network interface(s) 314 and/or the I/O interface(s) 316 include comprise Ethernet (IEEE 802.3), Fiber Distributed Data Interface (FDDI), Integrated Services Digital Network (ISDN), cable television and/or internet (ATSC, DVB-C, DOCSIS), Universal Serial Bus (USB) based interfaces, etc.

The processor 302, the network interface(s) 314, and/or the I/O interface(s) 316, the display device 324, and/or the speaker 326, may perform signal processing operations such as, for example, filtering, amplification, analog-to-digital conversion and/or digital-to-analog conversion, up-conversion/down-conversion of baseband signals, encoding/decoding, encryption/decryption, modulation/demodulation, and/or any other appropriate signal processing.

The computing system 300 (e.g., the network interface(s) 314) may use one or more antennas for wireless communications and/or one or more wired port(s) for wired communications. The antenna(s) may be any type of antenna (e.g., directional antennas, omnidirectional antennas, multi-input multi-output (MIMO) antennas, etc.) suited for the frequencies, power levels, diversity, and/or other parameters required for the wireless interfaces and/or protocols used to communicate. The port(s) may include any type of connectors suited for the communications over wired interfaces/protocols supported by the computing system 300. For example, the port(s) may include an Ethernet over twisted pair port, a USB port, an HDMI port, a passive optical network (PON) port, and/or any other suitable port for interfacing with a wired or optical cable.

As described above, the processing system 202 may process the sensor data from the sensors 204-218 to output notifications and/or to store and/or log data and/or events. The processing system 202 may use data from individual ones of the sensors 204-218 and/or may fuse data from multiple sensors. Example data processing that may be performed is disclosed below with reference to FIGS. 4-10.

Figure 4:
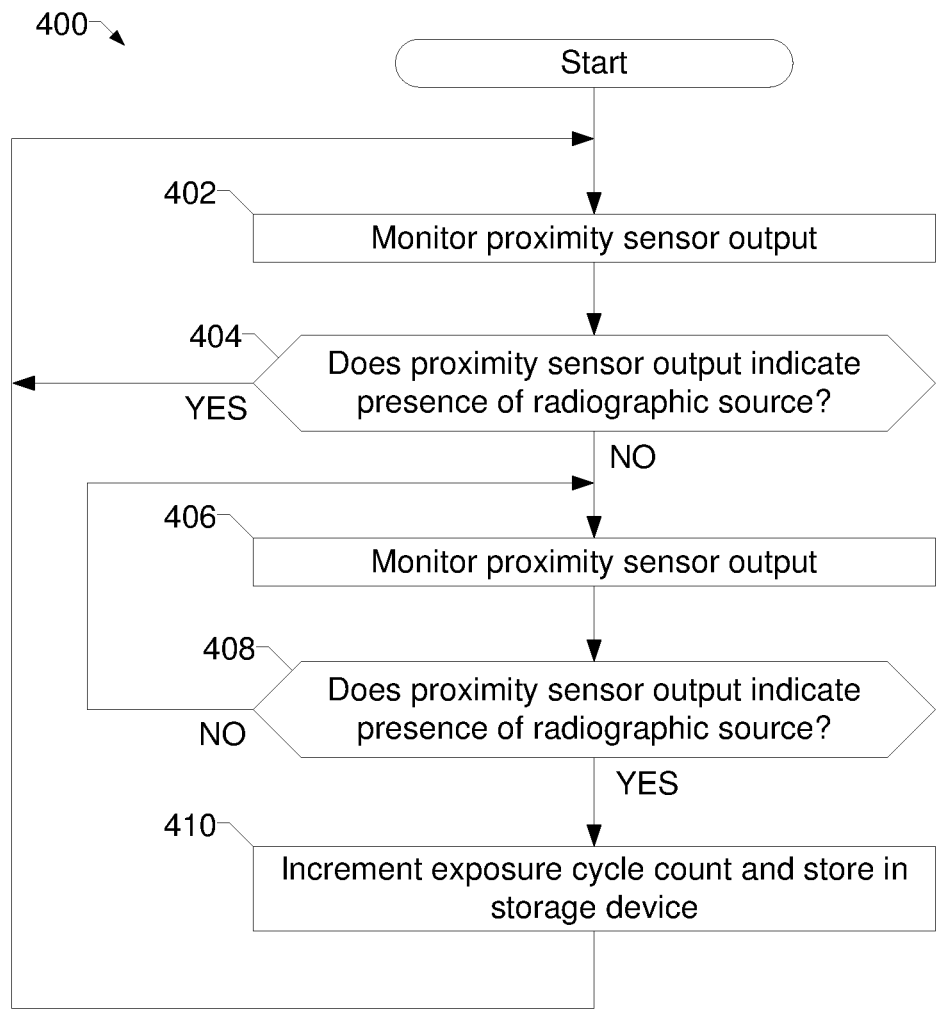
FIG. 4 is a flowchart representative of example machine readable instructions which may be performed by the example processing system of FIG. 2 to collect, store, process, and/or transmit sensor data to count exposure cycles.

FIG. 4 is a flowchart representative of example machine readable instructions 400 which may be performed by the example processing system 202 of FIG. 2 to collect, store, process, and/or transmit sensor data to count exposure cycles. The example instructions 400 are described below with reference to the radiographic source exposure device 200 of FIG. 2 and the computing system 300 of FIG. 3.

At block 402, the processing system 202 (e.g., via the processor 302) monitors the status of the proximity sensor 204 of FIG. 2 (e.g., via the I/O interface(s) 316). The proximity sensor 204 may provide an output that indicates whether the radiographic source 102 (or other element of the radiographic source exposure device 200) is in a predetermined position (e.g., the shielded position).

At block 404, the processor 302 determines whether the output of the proximity sensor 204 indicates the presence of the radiographic source 102. If the output of the proximity sensor 204 indicates the presence of the radiographic source 102 (block 404), control returns to block 402.

When the output of the proximity sensor 204 indicates the lack of presence of the radiographic source 102 (block 404), at block 406 the processor 302 may be set into an extended or exposed state and continues to monitor the output of the proximity sensor 204.

At block 408, the processor 302 determines whether the output of the proximity sensor 204 indicates the presence of the radiographic source 102. If the output of the proximity sensor 204 does not indicate the presence of the radiographic source 102 (block 408), control returns to block 406 and stays in the extended or exposed state.

When the output of the proximity sensor 204 indicates the presence of the radiographic source 102 (block 408), at block 410 the processor 302 increments an exposure cycle count (e.g., a total number of exposures performed using the radiographic source exposure device 200) and stores the cycle count in the storage device. A counted cycle may be identified as an extension of the radiographic source from the stored position (e.g., to an exposed position) and a return to the stored position. Control then returns to block 402 to monitor the proximity sensor 204 while the radiographic source 102 is in the stored position.

Figure 5:
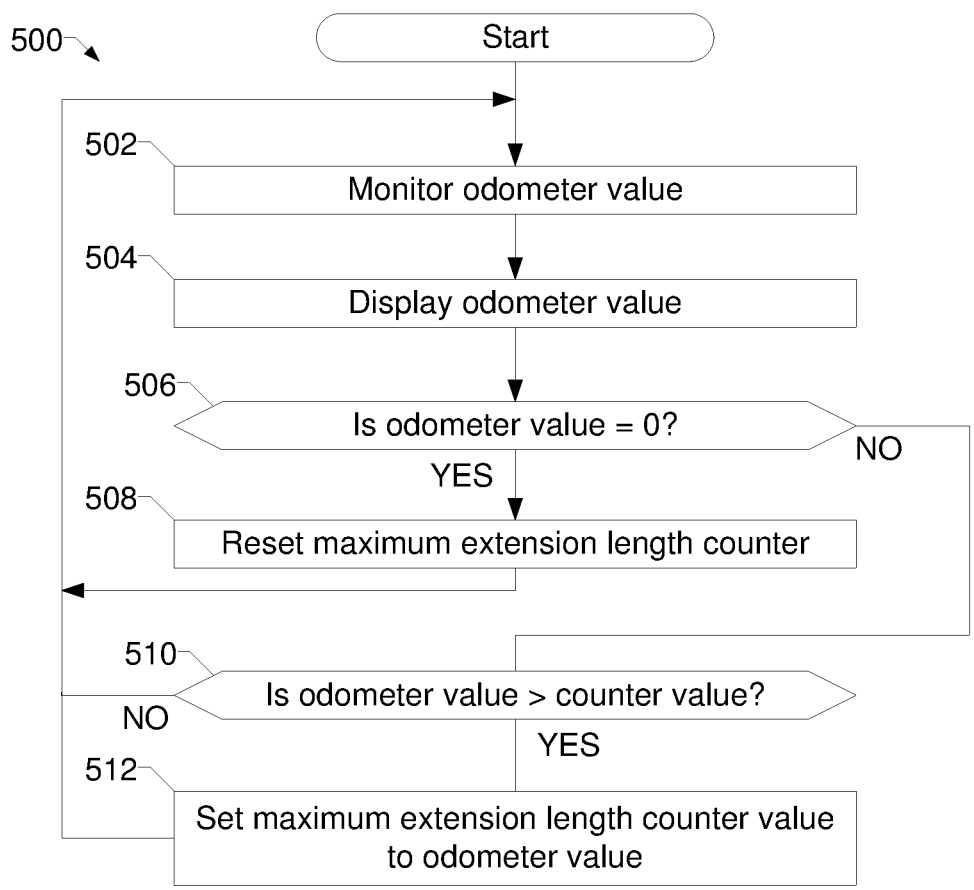
FIG. 5 is a flowchart representative of example machine readable instructions which may be performed by the example processing system of FIG. 2 to collect, store, process, and/or transmit sensor data to determine a position or extension of the radiographic source.

FIG. 5 is a flowchart representative of example machine readable instructions 500 which may be performed by the example processing system 202 of FIG. 2 to collect, store, process, and/or transmit sensor data to determine a position or extension of the radiographic source. The example instructions 500 are described below with reference to the radiographic source exposure device 200 of FIG. 2 and the computing system 300 of FIG. 3.

At block 502, the processing system 202 monitors an output value of the odometer 206. The odometer value may indicate a net distance between the stored position and the current position of the radiographic source 102.

At block 504, the processing system 202 displays the odometer value (e.g., via the display 324), which may be observable by the operator.

At block 506, the processing system 202 determines whether the odometer value is zero (or other reference value). If the odometer value is zero (block 506), at block 508 the processing system 202 resets a maximum extension length counter, which tracks a maximum extension length per exposure cycle. Control then returns to block 502 to continue monitoring the odometer value.

If the odometer value is not zero (block 506), at block 510 the processing system 202 determines whether the odometer value is more than the current value of the maximum extension length counter. If the odometer value is not greater than the counter value (block 510), control returns to block 502 to continue monitoring the odometer value. If the odometer value is greater than the counter value (block 510), at block 512 the processing system 202 sets the maximum extension length counter value to the odometer value.

Figure 6:
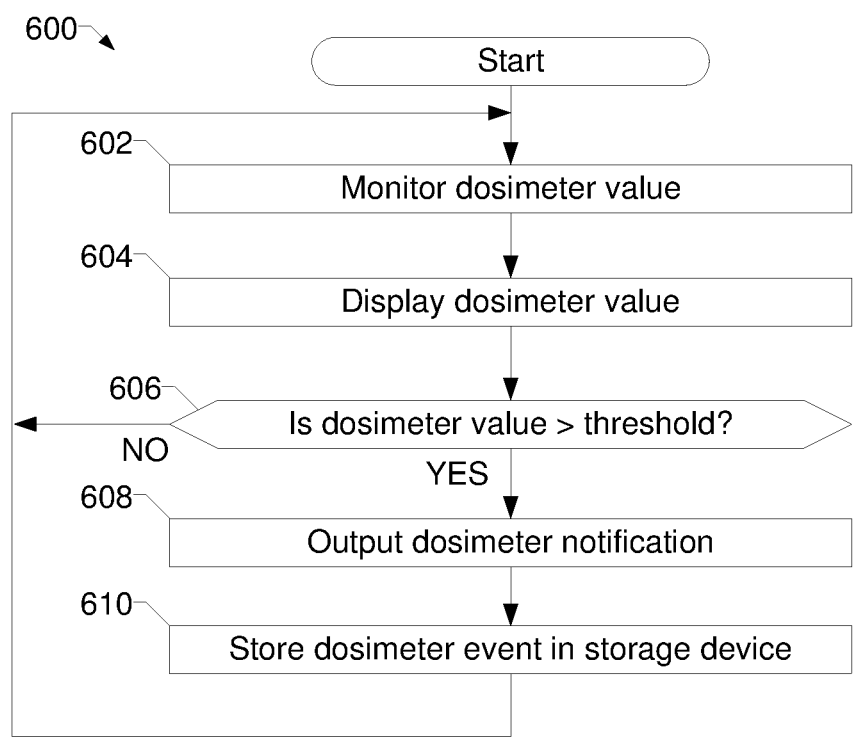
FIG. 6 is a flowchart representative of example machine readable instructions which may be performed by the example processing system of FIG. 2 to collect, store, process, and/or transmit sensor data to determine a surface dose.

FIG. 6 is a flowchart representative of example machine readable instructions 600 which may be performed by the example processing system 202 of FIG. 2 to collect, store, process, and/or transmit sensor data to determine a surface dose. The example instructions 600 are described below with reference to the radiographic source exposure device 200 of FIG. 2 and the computing system 300 of FIG. 3.

At block 602, the processing system 202 monitors the output value of the external dosimeter 208. At block 604, the processing system 202 displays the external dosimeter value (e.g., via the display device 324).

At block 606, the processing system 202 determines whether the dosimeter value is greater than a threshold value (e.g., an exposure threshold value indicating that the radiographic source is exposed or unshielded, or otherwise out of the stored position). If the dosimeter value is not greater than the threshold value (block 606), control returns to block 602 to continue monitoring.

If the dosimeter value is greater than the threshold value (block 606), at block 608 the processing system 202 outputs a dosimeter notification. The notification may be an audible alarm, visual alarm, and/or any other data communication or notification. At block 610, the processing system 202 stores the dosimeter event (e.g., an exposure event) in a storage device.

While blocks 606-610 respond to a dosimeter value over a threshold, in other examples the processing system 202 may respond to an external dosimeter value less than a threshold in a similar or different manner.

Figure 7:
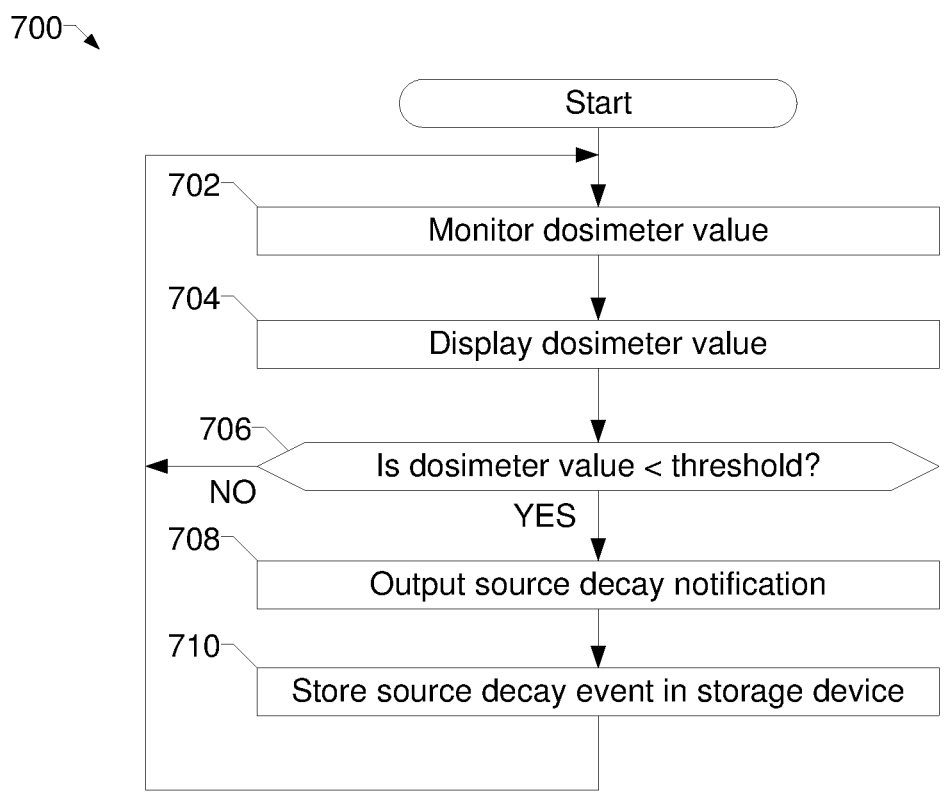
FIG. 7 is a flowchart representative of example machine readable instructions which may be performed by the example processing system of FIG. 2 to collect, store, process, and/or transmit sensor data to determine decay of the radiographic source.

FIG. 7 is a flowchart representative of example machine readable instructions 700 which may be performed by the example processing system 202 of FIG. 2 to collect, store, process, and/or transmit sensor data to determine decay of the radiographic source. The example instructions 700 are described below with reference to the radiographic source exposure device 200 of FIG. 2 and the computing system 300 of FIG. 3.

At block 702, the processing system 202 monitors the output value of the internal dosimeter 210. At block 704, the processing system 202 displays the internal dosimeter value (e.g., via the display device 324).

At block 706, the processing system 202 determines whether the dosimeter value is less than a threshold value (e.g., an exposure threshold value indicating that the radiographic source 102 is exposed or unshielded, or otherwise out of the stored position). In contrast with the external dosimeter 608, the internal dosimeter 210 is configured to have a higher dosimeter measurement when the radiographic source 102 is in the stored position. If the dosimeter value is not less than the threshold value (block 706), control returns to block 702 to continue monitoring.

If the dosimeter value is greater than the threshold value (block 706), at block 708 the processing system 202 outputs a dosimeter notification (e.g., indicating the radiographic source 102 is not in the stored position). The notification may be an audible alarm, visual alarm, and/or any other data communication or notification. At block 710, the processing system 202 stores the dosimeter event (e.g., an exposure event) in a storage device.

While blocks 706-710 respond to a dosimeter value over a threshold, in other examples the processing system 202 may respond to an internal dosimeter value less than a threshold in a similar or different manner.

Figure 8:
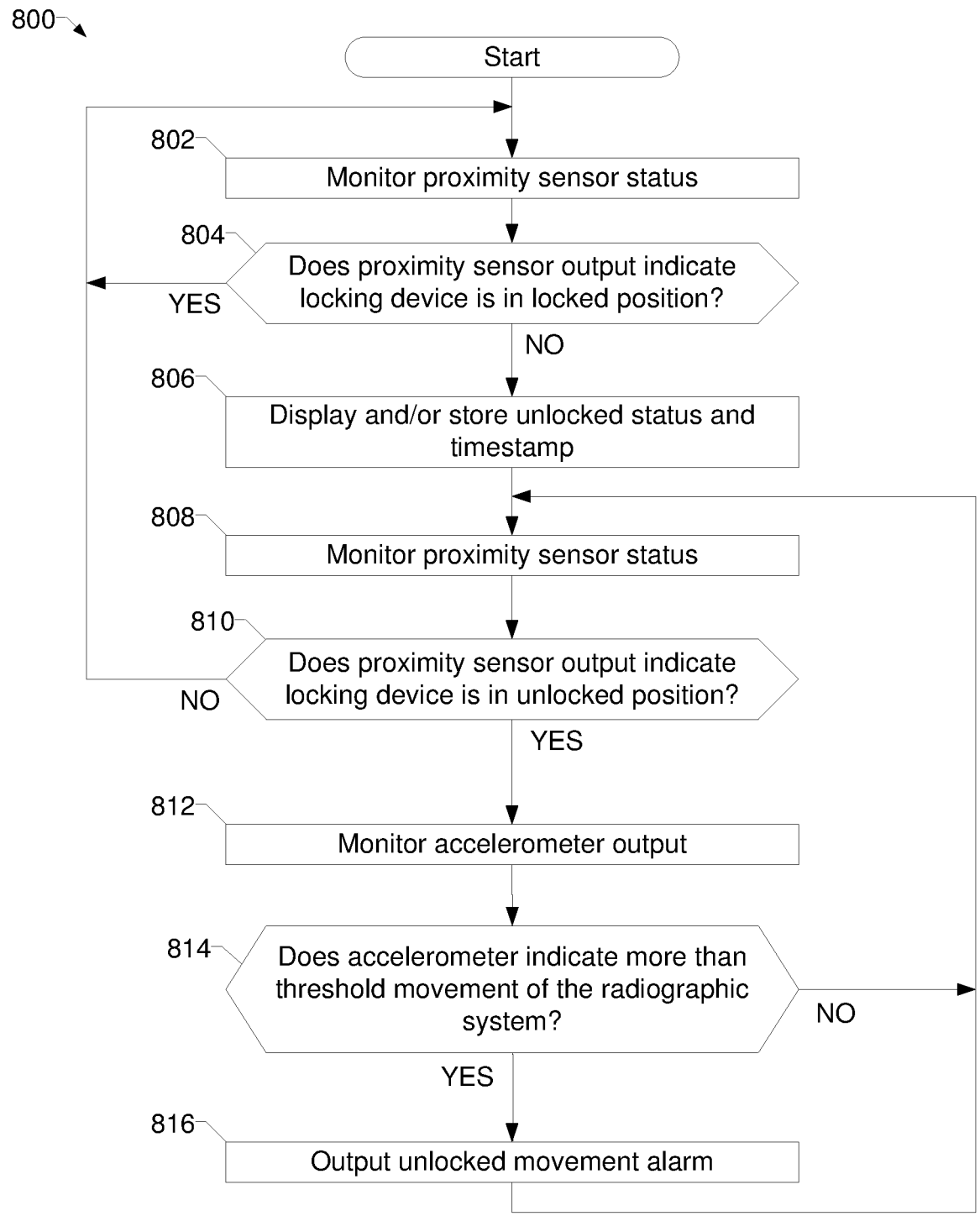
FIG. 8 is a flowchart representative of example machine readable instructions which may be performed by the example processing system of FIG. 2 to collect, store, process, and/or transmit sensor data to determine a locking mode and/or unlocking key status.

FIG. 8 is a flowchart representative of example machine readable instructions 800 which may be performed by the example processing system of FIG. 2 to collect, store, process, and/or transmit sensor data to determine a locking mode and/or unlocking key status. The example instructions 800 are described below with reference to the radiographic source exposure device 200 of FIG. 2 and the computing system 300 of FIG. 3.

At block 802, the processing system 202 monitors a status of the proximity sensor 212 (e.g., whether a component of the locking device 120 is in a predetermined position). At block 804, the processing system 202 determines whether the output of the proximity sensor 212 indicates that the locking device 120 is in a locked position. For example, the output of the proximity sensor 212 may indicate that the locking device 120 is in the locked position when the monitored component is detected in the predetermined position. If the output of the proximity sensor 212 indicates that the locking device 120 is in a locked position (block 804), control returns to block 802.

If the output of the proximity sensor 212 indicates that the locking device 120 is not in the locked position (e.g., the locking device 120 is in the unlocked position) (block 804), at block 806 the processing system 202 displays and/or stores the unlocked status and a timestamp. The storage of the unlocked status may be used to indicate the time, date, location, and/or any other data about an exposure event.

At block 808, the processing system 202 further monitors the status of the proximity sensor 212 (e.g., while the locking device 120 is in the unlocked state). At block 810, the processing system 202 determines whether the output of the proximity sensor 212 indicates that the locking device 120 is still in the unlocked position. If the output of the proximity sensor 212 indicates that the locking device 120 is no longer in the unlocked position (block 810), control returns to block 802 to monitor the proximity sensor 212 while the locking device 120 is in the locked position.

If the output of the proximity sensor 212 indicates that the locking device 120 is still in the unlocked position (block 810), at block 812 the processing system 202 monitors an output of the accelerometer 216. At block 814, the processing system 202 determines whether the accelerometer 216 indicates that more than a threshold movement of the radiographic source exposure device 200 (e.g., the housing 104) has occurred. For example, the processing system 202 may determine whether the accelerometer output indicates that the radiographic source exposure device 200 is being transported (while in the unlocked position). If the accelerometer 216 does not indicate more than a threshold movement of the radiographic source exposure device 200 (block 814), control returns to block 808.

If the accelerometer 216 indicates more than a threshold movement of the radiographic source exposure device 200 (block 814), at block 816 the processing system 202 outputs an unlocked movement alarm. For example, the processing system 202 may output an audible, visual, haptic, and/or any other type of alarm, alert, or notification to indicate to the operator that the radiographic source exposure device 200 is unlocked. Control then returns to block 808 to continue monitoring the proximity sensor 212.

Figure 9:
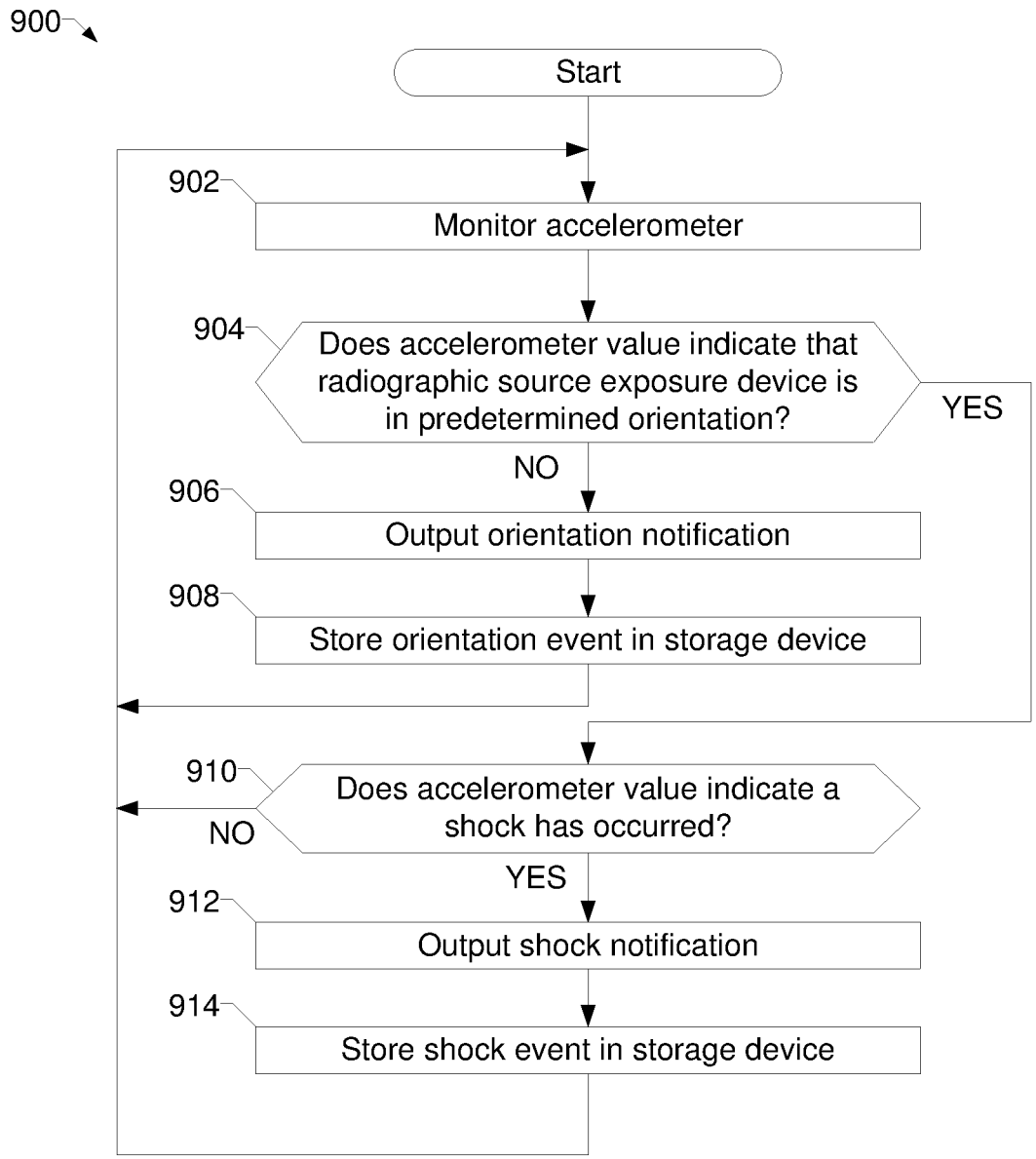
FIG. 9 is a flowchart representative of example machine readable instructions which may be performed by the example processing system of FIG. 2 to collect, store, process, and/or transmit sensor data to determine an orientation of the exposure device and/or identify a shock event.

FIG. 9 is a flowchart representative of example machine readable instructions 900 which may be performed by the example processing system of FIG. 2 to collect, store, process, and/or transmit sensor data to determine an orientation of the exposure device and/or identify a shock event. The example instructions 900 are described below with reference to the radiographic source exposure device 200 of FIG. 2 and the computing system 300 of FIG. 3.

At block 902, the processing system 202 monitors the output of the accelerometer 216. At block 904, the processing system 202 determines whether the output of the accelerometer 216 indicates that the radiographic source exposure device 200 is in a predetermined orientation. For example, the processing system 202 may determine the orientation of the radiographic source exposure device 200 based on the determination of the gravity vector via the accelerometer 216 and the known orientation of the accelerometer with respect to the housing 104 or shield 108. In some examples, the radiographic source exposure device 200 may only be permitted to be oriented in certain ways during use, storage, or transportation.

If the radiographic source exposure device 200 is not in a predetermined orientation (block 904), at block 906 the processing system 202 outputs an orientation notification. The orientation notification may be audible, visual, haptic, and/or any other notification method, and may indicate that orientation of the radiographic source exposure device 200 must be corrected. At block 908, the processing system 202 stores an orientation event in a storage device.

If the radiographic source exposure device 200 is in the predetermined orientation (block 904), at block 910 the processing system 202 determines whether the accelerometer 216 indicates that a shock has occurred. For example, a sufficiently high acceleration rate and/or high deceleration rate may indicate that the radiographic source exposure device 200 has been subjected to a shock force, such as being dropped or struck. If the accelerometer 216 does not indicate that a shock has occurred (block 910), control returns to block 902.

If the accelerometer 216 indicates that a shock has occurred (block 910), at block 912 the processing system 202 outputs a shock notification (e.g., audible, visual, haptic, and/or any other notification method) and at block 914 the processing system stores the shock event in a storage device for subsequent retrieval and/or review. Control then returns to block 902.

Figure 10:
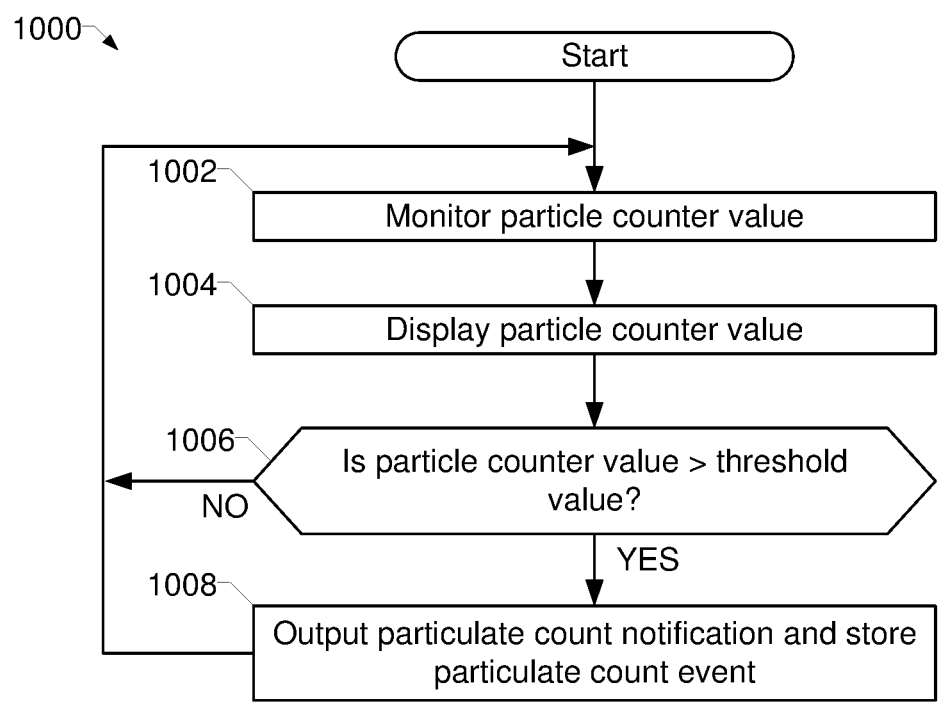
FIG. 10 is a flowchart representative of example machine readable instructions which may be performed by the example processing system of FIG. 2 to collect, store, process, and/or transmit sensor data to measure a particulate count within a shielding device.

FIG. 10 is a flowchart representative of example machine readable instructions 1000 which may be performed by the example processing system of FIG. 2 to collect, store, process, and/or transmit sensor data to measure a particulate count within a shielding device. The example instructions 1000 are described below with reference to the radiographic source exposure device 200 of FIG. 2 and the computing system 300 of FIG. 3.

At block 1002, the processing system 202 monitors an output of the particle counter 218. At block 1004, the processing system 202 displays the value output by the particle counter 218. In some examples, the display may be a running average value, a most recent value, a most recent maximum particle count, and/or any other useful count.

At block 1006, the processing system 202 determines whether the particle counter value is greater than a threshold value. The threshold value may be selected to represent a significant risk of degradation of the source tube 106 and/or source connector 112. If the particle counter value is greater than a threshold value (block 1006), at block 1008 the processing system 202 outputs a particle count notification (e.g., audible, visual, haptic, and/or any other notification method) and stores a particulate count event in a storage device for subsequent review and/or retrieval, and/or for a historical particulate count for prediction of maintenance.

If the particle counter value is not greater than a threshold value (block 1006), or after outputting the notification and storing an event (block 1008), control returns to block 1002.

Figure 11:
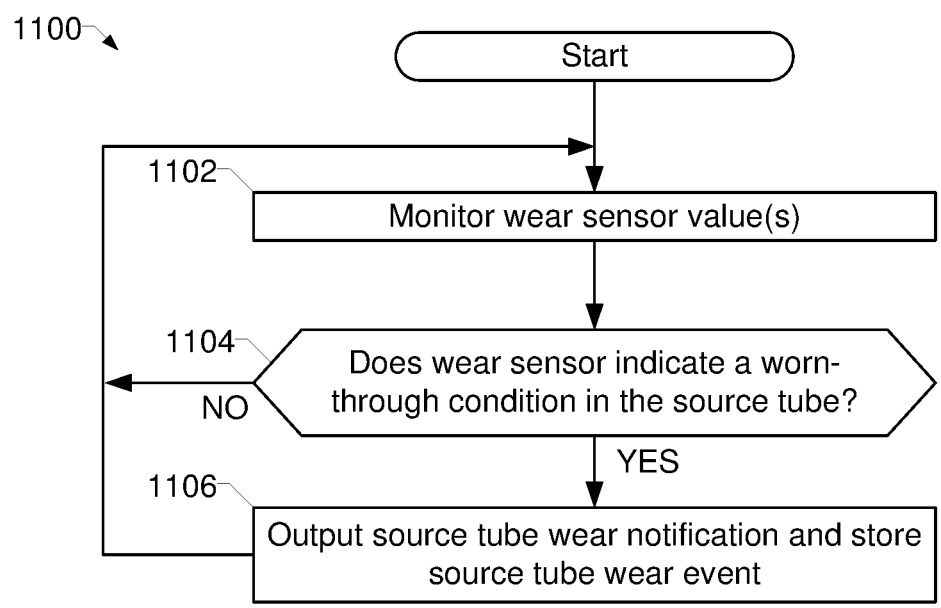
FIG. 11 is a flowchart representative of example machine readable instructions which may be performed by the example processing system of FIG. 2 to collect, store, process, and/or transmit sensor data to detect a worn-through condition of the source tube.

FIG. 11 is a flowchart representative of example machine readable instructions 1100 which may be performed by the example processing system 202 of FIG. 2 to collect, store, process, and/or transmit sensor data to detect a worn-through condition of the source tube 106. The example instructions 1100 are described below with reference to the radiographic source exposure device 200 of FIG. 2 and the computing system 300 of FIG. 3.

At block 1102, the processing system 202 monitors output value(s) of one or more of the wear sensor(s) 219. At block 1104, the processing system 202 determines whether the wear sensor value(s) indicate a worn-through condition in the source tube 106. If the wear sensor value(s) indicate a worn-through condition in the source tube 106 (block 1104), at block 1106 the processing system 202 outputs a source tube wear notification (e.g., audible, visual, haptic, and/or any other notification method) and stores a source tube wear event in a storage device for subsequent review and/or retrieval.

If the wear sensor value(s) do not indicate a worn-through condition in the source tube 106 (block 1104), or after outputting the notification and storing an event (block 1106), control returns to block 1102.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a source decay of the radiographic source, a locking device locking mode status, an unlocking key status, a particulate count within the shield, a shock event, or shield wear;
a processing system within the housing and configured to store the sensor data and output the sensor data; and
a power source within the housing and configured to provide power to the processing system.

2. The radiographic source exposure device as defined in claim 1, wherein the power source comprises a battery.

3. The radiographic source exposure device as defined in claim 1, wherein the processing system comprises communication circuitry configured to transmit the sensor data to an external computing system.

4. The radiographic source exposure device as defined in claim 1, further comprising a display device, wherein the processing system is configured to display information on the display device based on the sensor data.

5. The radiographic source exposure device as defined in claim 1, wherein the one or more sensors comprise an accelerometer to detect at least one of the radiographic source exposure device orientation or the shock event.

6. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system, wherein the power source comprises a battery, and
wherein the power source comprises a photovoltaic cell configured to convert radiation from the radiographic source to electrical energy when the radiographic source is in a stored position and store the electrical energy in the battery.

7. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise a proximity sensor configured to detect when the radiographic source is in a predetermined position to count the exposure cycles.

8. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise an odometer configured to measure a length between the radiographic source capsule position and the stored position.

9. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;

a processing system within the housing and configured to store the sensor data and output the sensor data; and a power source within the housing and configured to provide power to the processing system, wherein the one or more sensors comprise a dosimeter configured to detect whether the radiographic source capsule is in a stored position.

10. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise a proximity sensor configured to detect the locking device locking mode status by detecting a position of the locking device.

11. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise a proximity sensor configured to detect the unlocking key status.

12. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise a particle counter configured to measure the particulate count within the shield.

13. The radiographic source exposure device as defined in claim 12, wherein the particle counter is configured to count foreign material particulate.

14. The radiographic source exposure device as defined in claim 12, wherein the processing system is configured to determine a change to an inspection or maintenance schedule based on the particulate count.

15. A radiographic source exposure device, comprising:
a housing;
a radiographic source capsule within the housing, the radiographic source capsule having a radionuclide;
a shield within the housing and configured to shield the radiographic source capsule and to permit extension of the radiographic source capsule to expose the radiographic source capsule;
one or more sensors coupled to the housing, the one or more sensors configured to detect sensor data comprising one or more of: a count of exposure cycles, a length between the radiographic source capsule position and a stored position, a surface dose, a source decay of the radiographic source, a locking device locking mode status, an unlocking key status, a radiographic source exposure device orientation, a particulate count within the shield, a shock event, or shield wear;
a processing system within the housing and configured to store the sensor data and output the sensor data; and
a power source within the housing and configured to provide power to the processing system,
wherein the one or more sensors comprise a wear sensor configured to detect a worn-through condition in a source tube, the radiographic source capsule being housed within the source tube.

* * * * *